United States Patent
Calado Da Silva et al.

(10) Patent No.: US 9,512,043 B2
(45) Date of Patent: Dec. 6, 2016

(54) CERAMIC POWDERS COATED WITH A NANOPARTICLE LAYER AND PROCESS FOR OBTAINING THEREOF

(75) Inventors: João Manuel Calado Da Silva, Aljustrel (PT); Elsa Marisa Dos Santos Antunes, Aljustrel (PT)

(73) Assignee: INNOVNANO-MATERIAIS AVANCADOS, S.A., Aljustrel (PT)

( * ) Notice: Subject to any disclaimer, the term of this patent is extended or adjusted under 35 U.S.C. 154(b) by 1114 days.

(21) Appl. No.: 13/120,036

(22) PCT Filed: Oct. 13, 2008

(86) PCT No.: PCT/PT2008/000040
§ 371 (c)(1),
(2), (4) Date: Mar. 21, 2011

(87) PCT Pub. No.: WO2010/059070
PCT Pub. Date: May 27, 2010

(65) Prior Publication Data
US 2011/0183833 A1   Jul. 28, 2011

(51) Int. Cl.
*C04B 41/45* (2006.01)
*C01G 3/02* (2006.01)
(Continued)

(52) U.S. Cl.
CPC ............. *C04B 41/4584* (2013.01); *C01G 3/02* (2013.01); *C01G 9/02* (2013.01); *C01G 23/047* (2013.01); *C04B 35/62805* (2013.01); *C04B 35/62886* (2013.01); *C04B 35/62889* (2013.01); *C04B 35/62892* (2013.01); *C04B 35/62897* (2013.01); *C04B 35/63432* (2013.01); *C04B 41/009* (2013.01); *C04B 41/85* (2013.01);
(Continued)

(58) Field of Classification Search
CPC .................... C04B 41/4584; C04B 35/62886; C01G 3/02
USPC ........................................................ 427/215
See application file for complete search history.

(56) References Cited

U.S. PATENT DOCUMENTS 5,855,827 A    1/1999  Bussing et al.
6,652,967 B2 *  11/2003  Yadav et al. .................. 428/403
2011/0039103 A1   2/2011  Calado Da Silva

FOREIGN PATENT DOCUMENTS

PT    103838 A    2/2008
PT    104085 B    8/2009
WO    2009/144665 A2   12/2009

OTHER PUBLICATIONS

Li et al., Explosive Synthesis of Ultrafine Al2O3 and Effect of Temperature of Explosion, Combustion, Explosion, and Shock Waves, vol. 42, No. 5, pp. 607-610, 2006.*

(Continued)

*Primary Examiner* — Tabatha Penny
(74) *Attorney, Agent, or Firm* — John P. White; Cooper & Dunham LLP

(57) ABSTRACT

Ceramic powders are coated with a layer of nanoparticles of multiple crystalline structures. These coatings can be obtained by means of the introduction of precursors in water in oil emulsions, which upon decomposition during its detonation, form the nanoparticles that adhere to the surface of the ceramic powder intended to coat. The later base ceramic powder can be synthesized during the emulsion detonation (W/O) or simply be directly placed in its composition. The properties of the obtained coating, such as thickness, adhesion, porosity and coated surface percentage, can be adjusted.

11 Claims, 2 Drawing Sheets

(51) Int. Cl.
*C01G 9/02* (2006.01)
*C01G 23/047* (2006.01)
*C04B 35/628* (2006.01)
*C04B 35/634* (2006.01)
*C04B 41/00* (2006.01)
*C04B 41/85* (2006.01)
*C09C 1/36* (2006.01)
*C09C 1/40* (2006.01)
*C09C 3/06* (2006.01)

(52) U.S. Cl.
CPC ............... *C09C 1/36* (2013.01); *C09C 1/40* (2013.01); *C09C 3/063* (2013.01); *C01P 2002/72* (2013.01); *C01P 2004/03* (2013.01); *C01P 2004/84* (2013.01); *C01P 2004/86* (2013.01); *C04B 2235/3206* (2013.01); *C04B 2235/3217* (2013.01); *C04B 2235/3222* (2013.01); *C04B 2235/3232* (2013.01); *C04B 2235/402* (2013.01); *C04B 2235/448* (2013.01); *C04B 2235/5436* (2013.01); *C04B 2235/5445* (2013.01); *Y10T 428/2982* (2015.01)

(56) References Cited

OTHER PUBLICATIONS

Xiao Hong Wang et al.; "Nano-MnFe2O4 powder synthesis by detonation of emulsion explosive"; Applied Physics A; Materials Science & Processing, Springer, Berlin, DE, vol. 90, No. 3, Mar. 1, 2008, pp. 417-422; XP019588101; ISSN: 1432-0630.

International Search Report for PCT/PT2008/000040 dated Jul. 6, 2009.

* cited by examiner

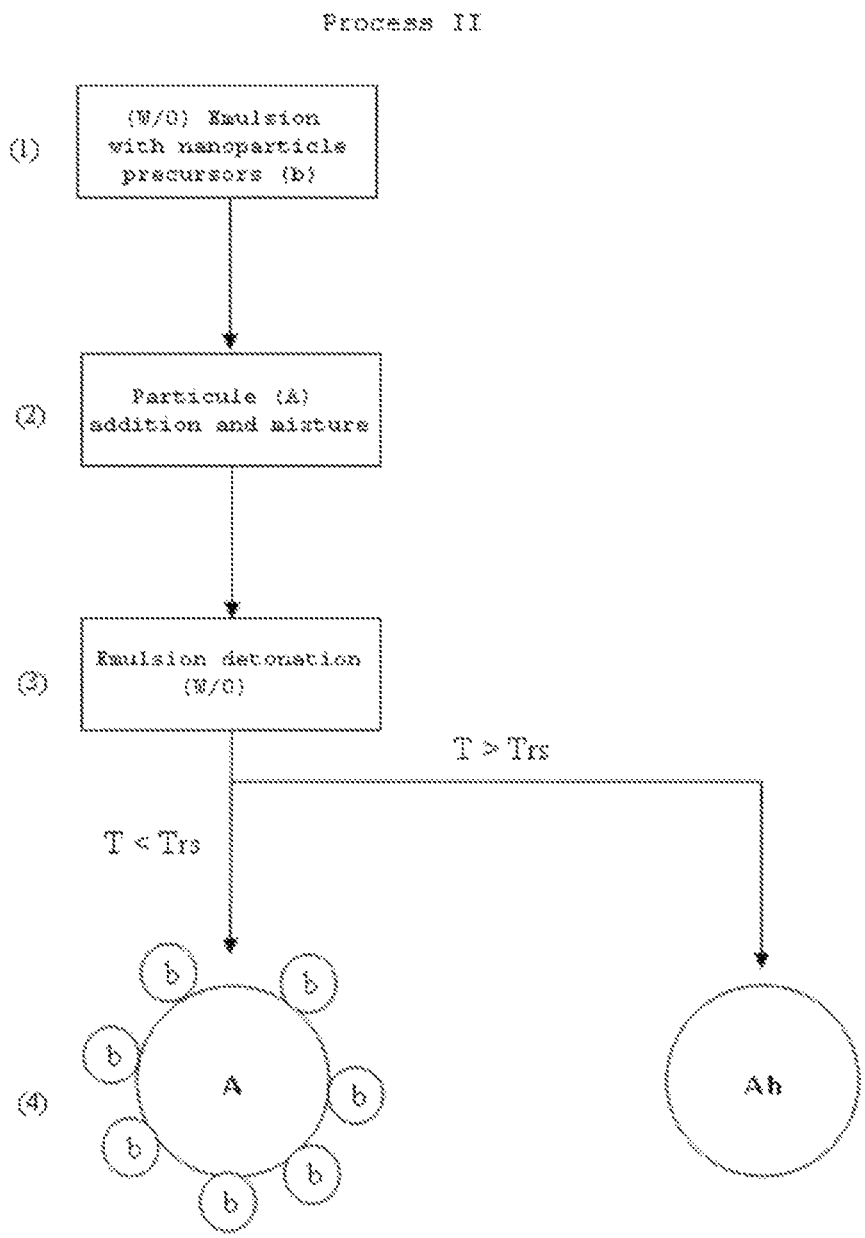

CERAMIC POWDERS COATED WITH A NANOPARTICLE LAYER AND PROCESS FOR OBTAINING THEREOF

This application is a U.S. national phase filing under 35 U.S.C. §371 of PCT Application No. PCT/PT2008/000040, filed Oct. 13, 2008, the entirety of which is incorporated by reference herein.

TECHNICAL DOMAIN OF THE INVENTION

The present invention concerns ceramic powders coated with nanoparticle layers of multiple crystalline structures, thickness, adhesion grade and crystallite size and process for obtaining these coated powders.

Therefore, the ceramic powders according to the present invention present optical, mechanical, electrical, magnetic, catalytic and of reactive properties substantially different from those of non-coated particles, which makes them particularly attractive for a set of applications in the nanotechnology field, such as electronics—for instance in semiconductor production, the biomedicine—for instance, in cancer treatments with magnetic nanoparticles surface-coated with functionality-enhanced nanoparticles in order to adhere to specific antibodies, chemistry—for instance in photocatalysis, in the ceramics industry—such as for obtaining sintering additives, in energy applications—such as in the nanographite material deposition onto the surface of certain materials, in order to increase its electrical conductivity.

BACKGROUND OF THE INVENTION

In the past years, the use of ceramic powders encapsulated in nanoparticle coatings has been the target of intense worldwide research, for a vast set of applications, in chemistry, biomedicine, electronics, ceramic and energy fields, aiming to benefit from the conjugation of the base particle properties and the unique effects introduced by the nanoparticle layer, which compose the coating of its surface.

Lately, considering the lack of knowledge concerning the impact resulting from nanoparticle absorption in living beings, as well as from the difficulties associated to its handling, the technique related to the adhesion of the nanoparticle layer to the surface of bigger-dimensioned particles has been used in the pursuit for conjugating the unique properties provided by nano dimension, but without the risks associates thereof.

The methods usually used to prepare ceramic coatings, are generally divided into four categories:

I—Coatings Via Chemistry Processes (Wet)

The micro emulsion and sol-gel deposition techniques are examples in this process. In the later, the four main steps are the following:

a) The colloidal particles intended to coat form a stable dispersion in a liquid, which also comprises the coating precursors;
b) These precursor deposition onto the particle surfaces by spraying, immersion or rotation;
c) The particles are polymerized during the removal of stabilizers, thus producing a gel in a continuous net;
d) The final thermal handling results in the pyrolysis removal of the organic materials, leaving a crystalline or amorphous coating.

The main difficulty in coating processes via wet chemistry consists of controlling de reaction speed of the coating particle formation, making it difficult to obtain uniform coatings, with high adhesions.

II—Coatings Via Gaseous Phase Deposition

The technology of chemical vapor deposition (CVD) is a very common example of this category. In this case, the coating precursor is heated and vaporized at high temperature (700-1000° C.), being later deposited in a fixed substrate.

This is a commonly-used method in coating tools; the coating thickness is high, typically between 5 and 12 microns, and there is no individual particle coating, but rather a substrate that might have several geometrical forms.

Another technique is the atomic layer deposition (ALD) that allows forming fine layers in a solid substrate, comprising two steps:

a) A gas, usually a gaseous organometallic precursor, is absorbed at the substrate surface;
b) Reaction of the first gaseous precursor with a second gas, forming a monolayer, the number of reaction cycles between both precursors being the factor that controls the film's final thickness.

Another more elaborated technique consists of the synthesis of the base particles and of the coating particles from two gaseous precursors injected at different times in a hot-wall aerosol flow reactor.

A key example of this technique is the coating of titania particles ($TiO_2$) with silica ($SiO_2$). The major disadvantage of this method consists of the low production volumes and their high costs.

III—Electrochemical Coatings

This approach starts from a suspension of particles intended to coat, to which a cation set is added, the cations being afterwards electrochemically reduced, forming a set of nanoparticles set which are deposited at the surface of the base particle. The formation and deposition of copper oxide ($CuO$) nanoparticles onto silica particles ($SiO_2$) is a classical example of the implementation of this technique.

IV—Dry Coatings

As an example, the projection technique, wherein a dense ceramic-target comprising the coating material, is sputtered by electrons, thus depositing it almost atom by atom in a substrate, thus forming a film. However, when one tries to coat particles of submicrometric dimensions, it becomes difficult to obtain a homogeneous coating in the particle, notwithstanding the fact that it is a quite costly method.

It is ascertained that the four families of methods previously enumerated present the following limitations:

a. Difficulty in coating individual ceramic particles, being more appropriate for substrate or surfaces coatings. This difficulty increases as the base particle dimension reduces;
b. Extreme difficulty in obtaining homogeneous coatings, essentially in terms of thickness and coated area;
c. Strong limitation on the type of nanoparticle crystalline structures which constitute the coating;
d. Difficulty in producing coatings with excellent adhesion to the base particle;
e. Difficulty in obtaining coatings formed by individualized nanoparticles on the surface of the base particle; normally, the particles are produced with a coat of a continuous film. This is an important limitation, once it doesn't allow benefiting from the advantages of the effects resulting from the nanometric dimension;
f. Extreme high dimension of the base particle crystallite and coating particle due to the thermal treatment step.

In its turn, the method proposed by the present invention consisting of the detonation of an (W/O) emulsion, to which at least a solid precursor was previously added, which decomposes during the emulsion detonation, forming the nanoparticles comprising the desired composition, quantity and crystalline structure for the coating. This method presents an enormous versatility, given that it promptly allows two different preparation means of the ceramic powders coated by a nanoparticle layer:

a) Synthesizing in the same (W/O) emulsion detonation step, both the ceramic powders intended to coat, as the nanoparticles that form the coating layer. For this purpose, two reaction kinetics are used differently for the precursors thereof, the formation reaction being extremely fast for the ceramic powders and slower in the case of decomposition of the precursors, which derive the nanoparticles that compose the coating layer.

b) Previously placing in the (W/O) emulsion starting composition the ceramic powders intended to coat, already prepared, together with the precursors that during detonation decompose into the nanoparticles that will form the coating layer.

Besides the said flexibility the process allows:

a. coating ceramic powders such as oxides, carbides, nitrides, inert metals, among others, from nanometric dimension to about 500 microns;

b. From the addition of different precursors to the (W/O) emulsion in stoichiometric proportions and of the combination among them during the detonation reaction, obtaining coatings with oxide nanoparticles in a multiplicity of crystalline structures (binary, ternary or superior), nitrides, inert metals, carbides, sulphides, etc;

c. As a result of the high temperatures, pressures and projection speed of the nanoparticles over the base particle, obtaining a coating with an extremely high adhesion grade;

d. Obtaining coatings with individual nanoparticles, without forming a continuous film, therefore allowing the change of the optical, mechanical, electrical, magnetic and catalytic properties of the base particles;

e. Obtaining crystallite sizes inferior to 50 and 20 nanometers both for the base particle and for the coating nanoparticles respectively;

f. High production capacities according to the high speed of the detonation reaction of the W/O emulsion.

The use of the (W/O) emulsion concept, for the nanoparticle synthesis, is referred in "Metal oxidize powder synthesis by the Combustion Method" Takoa Tami, Kazumasa Takatari, Vaovsashi Watanable and Nabuo Kaniya—Journal of Materials Research (1997). In this document a new method for the synthesis of nanometric alumina powders is disclosed (Emulaion Combustion Method—ECM), from the combustion with atmospheric air of an (W/O) emulsion, hollow alumina particles being obtained. However the method of the present invention uses a different regime, taken that the type of reaction occurring is detonation instead of combustion. Furthermore it does not require external air which allows a better control over the type of products and structures meant to be formed.

The document U.S. Pat. No. 5,255,827, in its turn, describes a cyclic process of detonation for the production of micrometric and nanometric powders and their projection at high-speed in different substrates, thus obtaining coated surfaces. The detonation happens in a gaseous mixture to which metals of fine granulometry are added, a suspension being formed. The process of the present invention stands out from the later due to the use of an (W/O) emulsion, in the liquid phase, to which solid precursors are added or dissolved, or still inert ceramic particles, making it possible to obtain individual particles coated with a nanoparticle layer.

More recently, references have been made to a (W/O) emulsion detonation for the production of ceramic materials, namely in a set of documents:

Document PT 103838, "Nanocrystalline spherical ceramic oxides, process for its synthesis and use thereof", discloses a detonation method at high temperatures (superior to 2000° C.) of an (W/O) emulsion comprising metals in its composition and at least a dissolved precursor, for obtaining dense micrometrical spherical particles. In the coating method now disclosed, although also based on the (W/O) emulsion detonation, this emulsion is added with new types of precursors, the inert ceramic particles, intended to coat and solid nanoparticle precursors, that are critical elements for its final result, the ceramic powders coated by a nanoparticle layer.

The document PT 104085, "Ceramic materials of nanometric dimension, process for its synthesis and use thereof", discloses a method for obtaining nanomaterials at low temperature (inferior to 2000° C.), from the detonation of two (W/O) emulsions, wherein the first is to stabilize the detonation front and the second has in its composition three types of precursors: dissolved oxidants in the internal phase, miscible fuels in the external phase and metals or alloys in the solid state, that combine during detonation in order to synthesize materials of nanometric dimension. However, in the method of the present invention, the (W/O) emulsion, additionally to the types of precursors already disclosed in the said document, comprises at least a precursor added to the (W/O) emulsion in the solid state, in way to guarantee sufficiently differentiated formation kinetics of the base particle and nanoparticles, in order to obtain a ceramic powder coated with nanoparticles. In another embodiment of the present invention, the inert ceramic particle intended to coat is directly added to the (W/O) emulsion and, unlike the precursors in the quoted document, it does not take part in the (W/O) emulsion detonation reaction, allowing the nanoparticles to deposit on its surface.

The document "Nano-MnFe2O4 powder synthesis by detonation of emulsion explosive" Xiao Hong Wang at al. discloses the synthesis of MnFe2O4 nanopowders from the detonation of an (W/O) emulsion, with the precursors of the nanoparticles dissolved in the (W/O) emulsion sensitized by a military explosive (RDX). However, in the process of the present invention, the (W/O) emulsion, besides the oxidants dissolved in its internal phase, equally referred in the sais document, requires at least a precursor added to the (W/O) emulsion in the solid state in way to guarantee sufficiently-differentiated formation kinetics of the base particle and of the nanoparticles, in order to obtain a ceramic powder coated by nanoparticles. In another embodiment of the present invention, the inert ceramic particle intended to coat is directly added to (W/O) emulsion and, unlike the precursors in the said document, it does not take part in the (W/O) emulsion detonation reaction, allowing the nanoparticles to deposit on its surface.

GENERAL DESCRIPTION OF THE INVENTION

The present invention relates to ceramic powders coated with a nanoparticle layer with different compositions and process for obtaining the same.

The coatings of the present invention present 4 multiplicity of crystalline structures, thickness of the coating layer between 5 and 150 nm, a percentage of coated surface area, among 50 to 95%, a high adhesiveness to the support base particle, changing their properties and functionalizing the base ceramic powders, for a multiple set of applications.

1—Process for Obtaining of Ceramic Powders Coated with a Nanoparticle Layer

The process for coating the ceramic powders surface with a nanoparticles layer of different crystalline structures, is based on the introduction of at least a precursor, in the solid state or dissolved in an (W/O) emulsion that, by decomposing during detonation result in nanoparticles, that are deposited onto the base particle that is intend to coat.

The said emulsion intended to detonate is of the (W/O) type, being broadly used, for instance, in the production of explosive emulsions. This emulsion comprises two intimately linked phases, under the action of a surfactant: the internal (aqueous) and the external (insoluble) phase.

The process of the present invention can comprise two different embodiments, differing not only in the formation of the base particle (A) intended to coat, but also in the introduction of the precursor(s) that originate the nanoparticles (b), of the coating layer (FIG. 1).

Therefore, while in the first embodiment, both the base ceramic particles and the coating nanoparticles are formed during the detonation of the (W/O) emulsion, on the second embodiment the ceramic particles intended to coat are directly placed and homogenized in the (W/O) emulsion.

The precursors of the coating nanoparticles are, in the first case, added in the solid state whereas, in the second case, they are generally dissolved in the internal structure of the (W/O) emulsion.

1.1 Synthesis of the Base Particles A and Coating b

In this first case both the base ceramic particle (A) and the coating nanoparticles (b), are synthesized during the (W/O) emulsion detonation step. The key aspect of this variant, is that the ceramic powder (A) precursors intended for coating and the nanoparticle (b) precursors, which constitute the coating layer, present very different reaction kinetics, during the (W/O) emulsion detonation.

In order to obtain this, the precursors of the base ceramic particle A are part of the emulsion internal structure, being dissolved in its internal phase, homogeneously mixed in the external phase, or being high reactivity metals, which allows them to present an extremely fast reaction kinetics, reacting inside or immediately behind the reaction zone, which is the zone that precedes and supports the advance of the shock wave, in the classical detonation model.

While the nanoparticle solid precursors are in the form of nitrides, sulphates, carbides, chlorides etc., for they are in the solid state and the respective decomposition reactions are highly endothermic, they do not react in the reaction zone, but in a very subsequent phase of the designated Taylor zone (or gas expansion), zone where the base particles A are already formed, once the temperatures are inferior to their melting points, thus resulting in the fact that its coalescence-based growth no longer occurs.

So being, the nanoparticles (b) are deposited and coat the surface of the base particles (A). This slower kinetics of the solid precursors is evidenced by the reduction (between 100 to 1000 m/s, according to the quantity of solid precursors added) of the (W/O) emulsion detonation speed, as a result of a smaller number of gaseous species that are formed in the reaction zone.

This variant presents an enormous advantage for during the stage of (W/O) emulsion detonation, both the base particles (A), and the coating layer nanoparticles (b) are formed.

The appropriate control of the process variables allows obtaining not only an enormous multiplicity of base particles of different dimensions and structures, but also base nanoparticles coatings, not only of binary structures (two elements from a single precursor), but also ternary (from two solid precursors which combine during its decomposition reaction). So being, for instance, it is possible to obtain a base ceramic particle with a spynel-type structure, such as $MqAl2O4$, coated by nanoparticles also of $MqAl2O4$, being for such sufficient that the (W/O) emulsion contains, in its internal phase, the stechiometric quantities of salts of magnesium and aluminium dissolved and, at the same time, be also added and mixed a certain quantity of solid precursors of the same elements (magnesium and aluminium), depending on the coating thickness intended, the precursor quantity being larger as the thickness and the percentage of coated area increase.

Therefore, in a first phase of detonation, the $MgAl2O4$ base particles are formed from the reaction of the salts dissolved in the (W/O) emulsion. In a second phase of detonation, the coalescence and growth process of the formed particles occurs, in a subsequent phase, the external solid precursors decompose and combine, thus forming the $MgAl2O4$ nanoparticles, which project and coat the $MgAl2O4$ base particle.

So being, and in a summary form, this variant of the process for preparing ceramic powders coated with a nanoparticle layer is constituted by the following steps:

1.1.1—Defining the Quantity of Precursors to Include in the Structure of the (W/O) Emulsion The components of the (W/O) emulsion are selected from the group of soluble oxidant precursors, soluble fuels, miscible fuels, the choice of its nature and relative ratio depending on the empiric formula, structure type and dimension of the ceramic powder (A) intended to coat. Starting from the stochiometry of the chemical reaction, it is possible to calculate the necessary quantity of each precursor for the formation of a given compound, and it is equally possible to estimate from the enthalpy of the chemical reaction the detonation temperature and the coalescence time of the particles. With these data it is possible to estimate the dimension of the formed particles.

1.1.2—Preparation of the (W/O) Emulsion

After defining the composition in the previous step, the step for the formation of a (W/O) emulsion begins, consisting of two intimately-linked phases, under the action of a surfactant: discontinuous internal phase (aqueous) and continuous external phase (insoluble).

1.1.2.1—Preparation of the Internal Phase

The internal phase of the (W/O) emulsion is a result of the dissolution of the precursors in water, according to the composition of the emulsion selected in 1.1.1. This phase id heated up to a temperature between (35-105° C.) above the crystallization point of all components, in order to allow its complete dissolution, which is important to obtain a good homogeneity of the formed products.

1.1.2.2—Preparation of the External Phase

The external phase of the (W/O) emulsion is obtained by mixing of the hydrocarbons or organic materials, that compose it with a surfactant appropriate to low pH values between 2 and 5), soft heating between 35-85° C., in order to guarantee the appropriate viscosity of the mixture at a close temperature of the internal phase, which is important to guarantee a good emulsification of the two phases required for carrying out stable and reproducible detonations.

1.1.2.3—Emulsification

The (W/O) emulsion according to the present invention is obtained by emulsification of both internal and external phases formerly prepared according to the previously described, in an emulsified matrix, and subsequently refined at about 60-150 psi, in order to obtain micelles of 1 to 10 microns so as to produce a stable emulsion, that is, a non-degradable emulsion during the mixture of the remaining precursors.

1.1.2.4—Addition of an Organic Sensibiliser

About 0.2 to 2% of an organic sensibiliser, such as expanded polystyrene or plastic spheres without contaminants, are added to the (W/O) emulsion, which is consumed in the detonation reaction and is responsible for regulating the density to a value between 1.15 and 1.25 g/cm$^3$, in order to assure the sensitivity level, which is requested to reach a stable detonation speed. The detonation speed varies depending on the density of the (W/O) emulsion between 4000 and 6000 m/s.

1.1.2.5—Addition of Metals

According to the dimension of the particle (A) intended to coat, the addition of metals in the solid state is endorsed, with subsequent homogenization in the (W/O) emulsion. The homogenization of the emulsion is fundamental to guarantee that the parameters of the detonation reaction remain stable through time and space.

The dimension of particle A depends on reaction temperature and coalescence time, and latter two parameters vary according to quantity of precursors and final material produced, the reaction/detonation temperature is the result of the difference between formation enthalpies of reagents and final products.

1.1.3—Addition the Solid Precursors of the Nanocoating

After (W/O) emulsion being prepared in 1.1.2, is added with subsequent homogenization the quantities of solid nanoparticle precursors, as nitrides, sulphates, chlorides, carbides, etc. which are defined according to structure type and other characteristics intended for the coating layer, such as thickness, percentage of coated area surface, adhesiveness grade, porosity, etc. The dimension of the nanoparticles that are part of the coating is determined according to the reaction temperature and coalescence time. The reaction temperature is essentially determined by the reaction enthalpy. The good homogenization of the precursors is fundamental to obtain a complete reaction among the precursors and obtain batches of coated reproducible ceramic powders.

1.1.4—Detonation of the (W/O) Emulsion

The (W/O) emulsion is subsequently placed in a cartridge of cylindrical geometry, for instance, in an appropriate material for detonation, such as paper, polyethylene or other material that it is selected in order not to introduce contaminants in the synthesized materials, with a diameter which is larger than its critical diameter (the critical diameter is the diameter from which it is possible to sustain a detonation, being usually experimentally determined) the detonation being then started inside an appropriate chamber from a detonation system, such as a detonator, a capacitive discharge system, laser system, among others.

1.1.5—Collecting and Treating the Reaction Products

The powders are dragged by the gases resulting from the detonation reaction, inside the expansion chamber, where they are cooled and collected in dry or wet means. Subsequently, they are subject to a drying process and characterization.

1.2—Particle A, Plus Synthesis of Coating (b)

In this alternative embodiment of the invention, there are mainly two different aspects of the methodology previously described: the first aspect refers to the placement of the ceramic powder (A) intended to coat directly in the (W/O) emulsion, instead of being synthesized according to the previously described embodiment of the invention.

The second aspect refers to the nanoparticle (b) precursors, which in this case are already part of the internal structure of the (W/O) emulsion and are not subsequently added in the solid state, unlike the previously described embodiment of the invention, thus allowing not only the reduction of the quantity of total solids in the final composition, but also the improvement of the (W/O) emulsion's rheology) processability and detonability. The incorporation of solids in the emulsion significantly increases its viscosity, which limits the solids % considered as possible to introduce and difficult its homogenization, this way being preferable to dissolve them in the internal phase.

During detonation reaction of the (W/O) emulsion, these precursors are quickly decomposed into nanoparticles and are deposited at the surface of the starting ceramic powders (A).

In this embodiment, the key step of the coating process includes the control of the system's atmosphere type (oxidant/reducing/inert), mainly the (W/O) emulsion detonation temperature, in order to assure two essential aspects: a) the base particle A does not decompose, for instance the carbides decompose at high temperatures into a solid oxide and they release gaseous $CO_2$; and b) no reaction in the solid state takes place between the base particle (A) and the nanoparticles (b) which compose the coating, such as for example, when one intends to coat base alumina particles, with MgO nanoparticles, the (W/O) emulsion detonation temperature should be inferior to 800° C., taken that a temperature above such value will result in an undesired side reaction in the solid state between the alumina and magnesium oxide, leading to the formation of another structure (spinel $MgAl2O4$), in the form of a single uncoated particle.

In order to avoid the situation described in a) it is necessary to maintain the detonation temperature below the decomposition temperature of particle A that is intended to coat. The reaction in solid state can always be avoided if the temperature of the detonation reaction is constantly inferior to the formation temperature of spinel-type compounds or of other structures. These data are found in phase diagrams, that have composition according to temperature.

It is worth being noted, however, that the formation of ceramic powders, with multiple crystalline structures (binary, ternary and superior), among which those of the spinel type, emerging from the reaction in the solid state, between the base particle (A) and the nanoparticles (b), when the detonation temperature is higher than the formation temperature of the desired structure, constitutes an extremely interesting and alternative method for the synthesis of this type of non coated compounds.

When compared to the embodiment previously described, this embodiment of the process of the present invention, in which the ceramic powder intended to coat is directly placed in the (W/O) emulsion, has a drawback in as much as the particle intended to coat has to be previously synthesized by any process, but in compensation it allows that, both the particles intended to coat and the coating nanoparticles can be more diversified including, for instance, oxides, nitrides, carbidea, sulphides, noble/inert metals. It comprises essentially the following stages:

1.2.1—Nanoparticles Precursors in the (W/O) Emulsion

The components of the (W/O) emulsion are selected from the group of soluble oxidant precursors, soluble fuels—such as the hydrazine and urea, for the synthesis of nitrides, miscible fuels, its relative ratio being dependent on empiric formula, on the structure type, and on the desired nanocoating (h) properties (thickness, percentage of base particle coated area, adhesiveness). The selection of the precursors is accomplished as described in 1.1.1.

1.2.2—Preparation of the (W/O) Emulsion

The preparation of the (W/O) emulsion is carried out as described in 1.1.2.

1.2.2.1—Preparation of the Internal Phase

The preparation of the (W/O) emulsion internal is carried out as described in 1.1.2.1.

1.2.2.2—Preparation of the External Phase

The preparation of the (W/O) emulsion external phase is carried out as described in 1.1.2.2.

1.2.2.3—Emulsification of Both Phases, in an Emulsified Matrix

The emulsification of the phases, for obtaining the (W/O) emulsion, is carried out as described in 1.1.2.3.

1.2.2.4—Addition of an Organic Sensitizer

The addition of an organic sensitizer is carried out as described in 1.1.2.4.

1.2.3—Addition of Base Particles A Intended to Coat

Subsequently, the base particles A intended to coat are added in doses to the (W/O) emulsion, which was prepared as previously described, being followed by homogenization.

1.2.4—(W/O) Emulsion Detonation

The detonation of the (W/O) emulsion is carried out as described in 1.1.4.

1.2.5. Collecting and Treating the Reaction Products

The collection and treatment of the reaction products is carried out as described in 1.1.5.

2—Characterization of the Coatings

The coatings according to the present invention; intended for ceramic particles comprise a nanoparticies layer, and are based on the detonation of a (W/O) emulsion, according to the process of the present invention. Since they are obtained at simultaneously high temperatures and pressures, they present a set of peculiar properties:

2.1. Characterization of the Base Ceramic Particles Intended to Coat

These particles present the following as main characteristics:
  a) they are constituted by a multiplicity of chemical compound families, such as oxides, nitrides, carbides, sulphides, noble metals;
  b) they comprise dimensions between 20 nm up to about 500 microns, of different morphologies, once the morphology of the particle does not affect the coating type;
  c) they present crystallite sizes inferior to 50 nm.

2.2. Characterization of the Coating Layer
  a) it is formed by a metallic oxide nanoparticle layer of binary, ternary or superior structure, or a layer of nitrides, carbides, sulphides, noble/inert metals;
  b) it has a thickness that can vary between 5 and 150 nm, depending on the quantity and size of the formed nanoparticles;
  c) it coats an area from 50 to 95% of the total surface area of the base particle, depending on the purpose of application;
  d) it is formed by individual spherical primary particles, between 20 and 100 nm, that allow altering the optical, magnetic, electrical, thermal and catalytic properties of the base ceramic particle.
  e) it presents crystallites inferior to 20 nm;
  f) it presents an adhesiveness grade to the base particle, that allows maintaining the coating, even when the coated particles in aqueous suspension, are subject to sonification with at 400 watts;
  g) Presents a high homogeneity grade, superior to 70%.

In order to characterize the above mentioned properties, it is necessary to appeal to the following physiochemical methods:

X-Ray Diffraction

The X-ray diffraction is an indispensable in coating characterization, once it allows identifying the compounds present in a given sample. when a particle A (base particle) is coated by a particle (B), it means that two different compounds are identified by the X-ray diffraction technique; when a single compound is identified, it means that the detonation reaction conditions were not the ideal for a coating formation, except when the compound of the base particle is similar to the coating compound. By using the X-ray diffraction technique it is possible to quantify the percentage of each compound in a given sample. The size value of the crystallite is determined from Scherrer equation and with the width values at half height of the most intense pick of the X-ray diffractogram. However, this technique should be complemented with the scanning electron microscopy.

Scanning Electron Microscopy—SEM

The microscopy plays a fundamental role in coating characterization, given that it allows the morphology observation of a given compound, giving way to asses whether there are individual particles or coated particles with particles of nanometric dimension. This technique further allows quantifying dimension of the base particle as well as dimension/thickness of the nanoparticles responsible for the coating.

Nowadays, high resolution equipments are equipped with a technique which is commonly used in coating characterization and sample chemical composition—EDX—Energy Disperse X-Ray Analysis. This technique allows evaluating the chemical elements present in a sample, in a particle or, in the limit, in a certain area of the particle. The information of this technique conjugated with the results from X-ray diffraction makes it possible to determine the base particle and coating compositions. In the case where the EDX provides the option of carrying out X-ray diffraction maps, it is possible to quantify the coating area through an appropriate image software. The result of a X-ray diffraction map is an image with the elements of the sample identified by different colours.

In short, with the SEM and EDX it is possible to evaluate the homogeneity of the coating, the dimension/thickness of the nanoparticles which are responsible for the coating of the base particle and the respective percentage of coated area.

Particle Size Distribution

The preparation of a suspension for determining the particle size distribution can be decisive to evaluate qualitatively the adhesiveness of the nanoparticles to the base particle. If the particle size distribution is not sensitive to the intensity and time of sonification application of ultrasound in a sample), it means that the adhesion of the coating is quite intense. The results of the particle size distribution should be conjugated with the SEM images, once in the SEM it is possible to evaluate the size of the base particles and coating nanoparticles, if in the particle size distribution particles with the characteristic dimension of the coating nanoparticles appear, it means that its adhesiveness to the base particle is weak, given that such link was broken with ultrasound application during the preparation of the sample suspension. For instance, in the case of an excellent adhesion of the coating to the base particle, the result of the particle size distribution shall reflect only the base particle size that should be coherent with the size observed in the SEM

BRIEF DESCRIPTION OF THE DRAWINGS

FIG. 1 illustrates the three steps that are part of the two processes of the present invention:
In process I, wherein both the base ceramic particle A and the nanoparticles of the coating layer (b) are synthesized simultaneously, step 1 consists of the preparation of the (W/O) emulsion, comprising the precursors, such as dissolved salts or metals of the base ceramic particle (A). In step 2 the nanoparticles solid precursor is added, which presents a slower reaction kinetics. Finally, in the third step, the (W/O) emulsion detonation occurs, of which a ceramic particle (A) results being coated by a nanoparticles layer (b).
In the process II, the first step is constituted by the preparation of the emulsion (W/O), comprising the nanoparticles precursors (b), as salts or soluble fuels. In the second step, the base ceramic particles are added (A), which are intended to coat. Finally, the third step, such as process I, consists of the detonation of the (W/O) emulsion of the first step, of which ceramic particles (A) coated with nanoparticles (b) result.

FIG. 2
Process II—Placement of A more synthesis of b
a)—Ceramic particle (A) coated by nanoparticles (b)
b)—Ceramic particle (Ab) with single crystalline structure—production of a single particle without coating
A—base ceramic particle
b—nanoparticles coating
T—reaction temperature of the (W/O) emulsion
Trs—reaction temperature in solid state
FIG. 2 illustrates the subdivision of the process II, wherein depending on the temperature of the (W/O) emulsion detonation, different situations in terms of products are obtained, namely for
a)—Temperature of (W/O) emulsion detonation inferior to the reaction temperature in the solid state (Trs), among the particles (A) and the nanoparticles (b), resulting in base particles (A) coated by nanoparticles (b);
b)—Temperature of (W/O) emulsion detonation superior to the reaction temperature in the solid state, among the base ceramic particles (A) and the nanoparticles (b), it give rise to an uniform ceramic powder (non coated), with binary, ternary or superior crystalline structure.

DETAILED DESCRIPTION OF THE INVENTION

Figure 1:
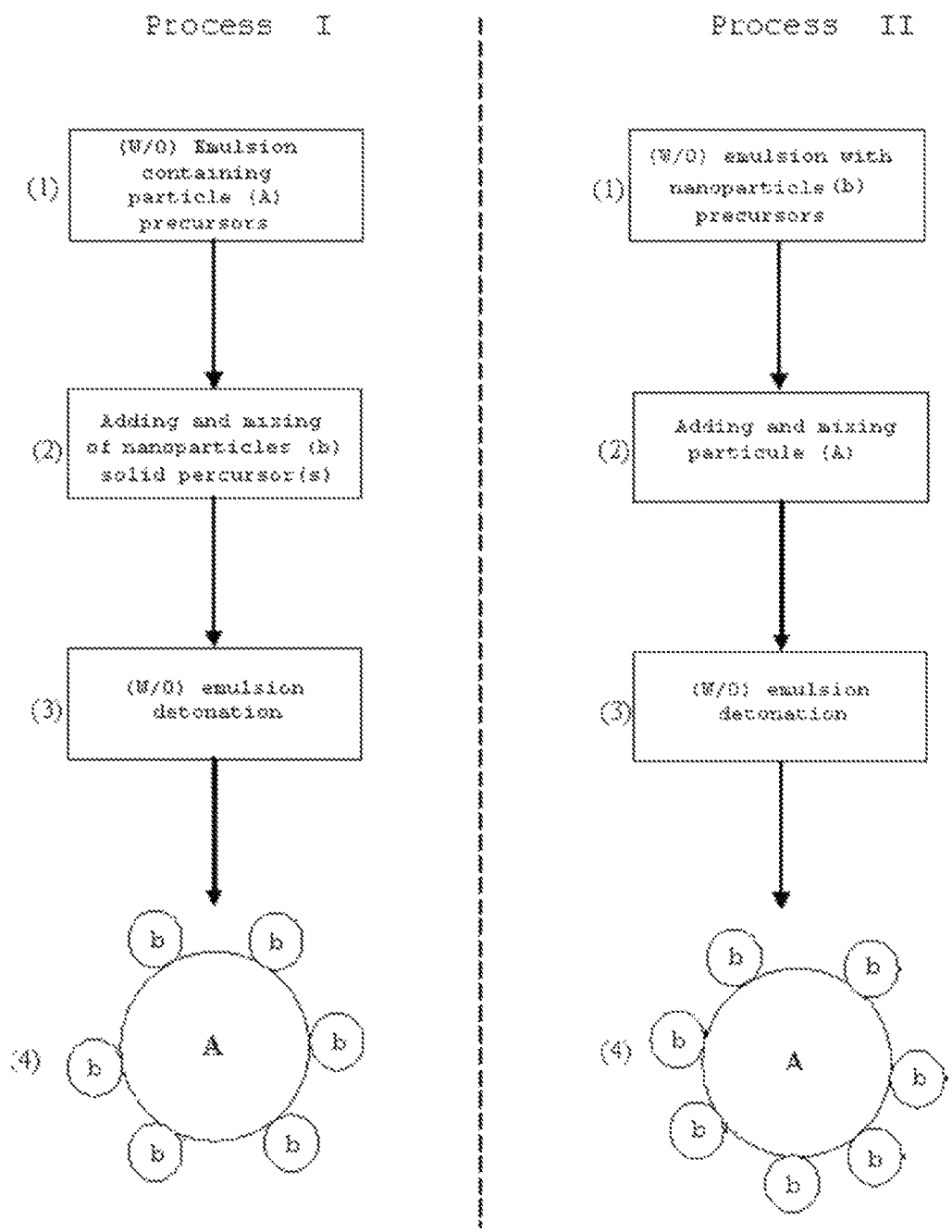
FIG. 1
Process I—Simultaneous synthesis of A and b
Process II—Placement of A plus synthesis of b
A—base ceramic particle.
b—coating nanoparticle

1. Process for Obtaining Nanometric Coatings, in Ceramic Particles.

The process for obtaining ceramic powders, coated with a nanoparticle layer, depends in the first place on the powder type that is intended to be coated:

a. Synthesis of the Base Particles A and Coating b

In the case of an oxide, it is possible to synthesize and coat it with nanoparticles of the same, or another oxide in this embodiment by introducing precursors with fast decomposition kinetics for the formation of the oxide intended for coating, and slow decomposition kinetics for the nanoparticle formation of the coating oxide, the process presenting the following sequence:

1.1.a. Quantity of Precursors

Determination of the precursor quantities of fast decomposition kinetics intended to dissolve in the (W/O) emulsion internal phase, according to the formula, structure and dimension of the particle intended to coat.

1.2.a Internal Phase Preparation

For the preparation of the internal phase the precursors are dissolved in water, according to the composition previously selected. Subsequently, the solution is heated up to a temperature (35-175° C.) superior to the crystallization point of the different reagents.

1.3.a. External Phase Preparation

The preparation of the emulsion external phase takes place by mixing the hydrocarbons or organic materials that compose it, with a surfactant appropriate to the mixture's pH values. The mixture is heated up to a temperature among 35-85° C.

1.4.a. Emulsification of the Internal Phase with the External Phase

The emulsification of both phases in an emulsified matrix takes place in an emulsifier appropriate to the viscosity range and an emulsified matrix is thus obtained. Subsequently, a refining takes place at about 60-150 psi, by making the emulsion pass by static mixers.

1.5.a. (W/O) Emulsion Sensitizing

Soon afterwards, the addition of an organic sensitizer occurs (0.2 to 2%), such as expanded polystyrene or plastic spheres without contaminants, which is consumed in the detonation reaction and is responsible for regulating the density to a value inferior to 1.25 g/cm3, in order to assure the sensibility level requested, to reach a stable detonation speed.

1.6.a. Addition and Homogenization of the Precursors

The last phase for preparing the detonation composition is mixing the sensitized (W/O) emulsion with the two precursors in the previously defined ratios. This mixture, the detonable composition, is made in a mechanical stirred tank, at a very slow speed to avoid precursor friction or degradation.

1.7.a—Detonation of (W/O) Emulsion.

The (W/O) emulsion is subsequently placed in a cylindrical cartridge (or presenting a different geometry, such as spherical or of plane faces) made of paper, polyethylene or any other material, with a diameter which is superior to its critical diameter and it is initiated inside an appropriate chamber from a detonator, or any other system with similar effects, such as, capacitive discharge, laser, etc.

1.8.a.—Collecting and Treating the Reaction Products.

The powders are dragged by the gases resulting from the detonation reaction inside the expansion chamber where they are cooled and collected in dry or wet means.

b) Particle (A) Plus the Synthesis of the Nanoparticles (b)

This method stands out from the previous for the fact that the particle A, the particle intended to coat, is introduced in the composition instead of being synthesized during the detonation reaction.

The process steps are the following:

1.1.b. Quantity of Precursors/Particle A

Determining the quantities of particle A and precursors according to the nanoparticles formula and structure, as well as of the intended coating properties.

1.2.b. Preparation of the Internal Phase

For the preparation of the internal phase, the precursors are dissolved in water, according to the composition previously selected. Subsequently, the solution is heated up to a temperature (35-105° C.) superior to the crystallization point of the different reagents.

1.3.b. Preparation of the External Phase

The preparation of the emulsion external phase takes place through the mixture of hydrocarbons or organic materials that compose it, with a surfactant appropriate to the mixture pH values. The merge is heated up to a temperature between 35-85° C.

1.4.b. Emulsification of the External Phase with the Internal Phase

The emulsification of both phases, in an emulsified matrix, takes place in an emulsifier appropriate to the viscosity range and an emulsified matrix is thus obtained. Subsequently, a refining at about 60-150 psi occurs, by means of passing of the emulsion through static mixers.

1.5.b. Adding the Sensitizer

Soon afterwards the addition of an organic sensitizer is promoted (0.2 to 2%), such as expanded polystyrene or plastic spheres without contaminants.

1.6.b. Adding and Homogenizing the Base Particle (A)

Adding the base particles intended to coat with subsequent homogenization of the (W/O) emulsion.

1.7.b. Detonation of (W/O) Emulsion.

The (W/O) emulsion is subsequently placed in a cylindrical cartridge (or any other geometry such as a sphere or plane faces) made of paper, polyethylene or any other material, with a diameter which is superior to its critical diameter and initiated inside an appropriate chamber starting from a detonator, or any other system with similar effects, such as capacitive discharge, laser etc.

1.8.b Collecting and Treating the Products.

The powders are dragged, by the gases resulting from the detonation reaction inside of the expansion chamber where they are cooled and collected in dry or wet media. Subsequently, they are referenced and characterized.

EXAMPLES

The first two examples herein presented illustrate two different ways of carrying out coatings according to the method of detonating an (W/O) emulsion.

Example 1

Synthesis of Base Particle and Coating

Obtaining alumina particles ($Al_2O_3$), coated with copper oxide nanoparticles by using aluminium and copper sulphate as precursors in an (W/O) emulsion composition:

1. A composition with the following components was prepared:
   Sensitized W/O emulsion; 80%
   Pentahydrated copper Sulphate: 16%
   Aluminium (particle size<200 microns) 4%

1.1. The preparation of the detonable composition was carried out according to the following stages:

1.1.1. Preparation of the oxidant solution, Internal phase: dissolution of 90% ammonium nitrate in 10% demineralised water in a stirred tank at 100° C.

1.1.2. Preparation of the external phase: homogeneous mixture of 80% vegetable oil with 20% surfactant.

1.1.3. Emulsification of external and internal phases: emulsifying in an emulsifier appropriate to the viscosity range, the two phases obtaining an emulsified matrix.

1.1.4. Preparation of the sensitized W/O emulsion: homogeneous mixture, in a mechanical stirred tank, 99.7% of the emulsified matrix with 0.3% expanded polystyrene, the final product being designated sensitized W/O emulsion.

1.1.5. The last phase of the composition preparation intended for detonation consists of mixing the sensitized W/O emulsion with both precursors in the above-mentioned ratios. This mixture, designated detonable composition, is carried out in a mechanical stirred tank, at a very slow speed in order to avoid metal friction.

2. The detonable composition was put in a paper cartridge with a 35 mm diameter and 200 mm long. Subsequently detonation was carried out, by using the electrical detonator as detonation ignition source.

3. Collecting, treating and characterizing the products The alumina powder coated with copper oxide was collected in wet state and as dried at 70° C. Subsequently, a representative sample was subject to the following analyses: observation in SEM, X-ray diffraction and particle size analysis.

Example 2

Previous Placement of the Base Particle in the (W/O) Emulsion

Obtaining Titania ($TiO_2$) Coated with Zinc Oxide (ZnO) nanoparticles

A composition was prepared comprising the following components:
   sensitized W/O Emulsion: 85%
   Titania (particle size inferior to 500 nanometers): 15%

1.1. The preparation of the detonable composition was carried out according to the following stages:

1.1.1. Preparation of the oxidant solution—Internal phase: dissolution and homogenization of 50% ammonium nitrate with 50% zinc nitrate hexahydrated in a stirred tank at 90° C.

1.1.2. Preparation of the external phase: homogeneous mixture of 70% vegetable oil with 30% surfactant appropriate for values of about 3.

1.1.3. Emulsification of the external and internal phases: in an emulsifier adequate to the viscosity range, emulsifying the two phases obtaining an emulsified matrix.

1.1.4. Preparation of the sensitized W/O emulsion: homogenous mixture, in a mechanically stirred tank, 99.5% emulsified matrix with 0.5% expanded polystyrene, the final product being designated sensitized W/O emulsion.

1.1.5. The last phase for the preparation of the composition intended for detonation is mixing of the sensitized W/O emulsion with the two precursors in the above mentioned ratios. This mixture, designated detonable composition, is carried out in a mechanically stirred tank.

2. The detonable composition was placed in a paper cartridge with a 35 mm diameter and 200 mm long. Subsequently, its detonation followed, under application of the electrical detonator as a detonation ignition source.

3. Collecting, handling and characterizing the products The alumina powder coated with copper oxide was collected in wet state and was dried at 70° C. Subsequently, a representative sample was subject to the following analyses: observation in SEM, X-ray diffraction and particle size analysis.

Example 3

Previous Placement of the Base Particle in the Emulsion (W/O)

Obtaining non-coated magnesium aluminate ($MgAl_2O_4$) (Process II.b) from magnesium oxide (inert) and aluminium.

A composition was prepared comprising the following components

W/O Emulsion sensitized: 76.6%

Magnesium oxide (Particle Size inferior to 1 micron): 10%

Granulated aluminium (Particle size inferior to 160 microns): 13.4%

1.1. The preparation of the detonable composition was carried according to the following steps:

1.1.1. Preparation of the oxidant solution. Internal phase: dissolution and homogenization of 90% of ammonium nitrate with 10% of demineralised water in a stirring tank at 90° C.

1.1.2. Preparation of the external phase: homogeneous mixture of 80% vegetable oil with 20% surfactant adequate for pH values between 3 and 5.

1.1.3. Emulsifying the external phase and internal phase: in an emulsifier appropriate to the viscosity range, emulsifying both phases thus obtaining an emulsified matrix.

1.1.4. Preparation of the sensitized W/O emulsion: homogeneous mixing in a mechanically stirred tank of 99.6% emulsified matrix with 0.4% expanded polystyrene, the final product being denominated sensitized W/O emulsion.

1.1.5. The last phase for preparing the composition intended for detonation consists of mixing the sensitized W/O emulsion with both precursors following the above-mentioned ratios. This mixture, designated detonable composition, is carried out in a mechanically stirred tank.

2. The composition intended for detonation was placed in a paper cartridge with a 35 mm diameter and approximately 200 mm long. Subsequently, its detonation followed, under application of the electrical detonator as a detonation ignition source.

3. Collecting, treating and characterizing the products The magnesium aluminate powder was collected in wet state and was dried at 100° C. Subsequently, a representative sample was subject to the following analyses: observation in SEM, X-ray diffraction and particle size analysis.

TABLE 1

Characteristic of ceramic powders coated according to the conditions in examples 1 and 2

| Properties | Example 1 | | Example 2 | |
| --- | --- | --- | --- | --- |
| | Base particle-A | Nanoparticle coating | Base particle-A | Nanoparticle coating |
| material | alumina | Copper oxide | titania | Zinch oxide |
| Crystalline phases | Alpha | Tenorite | Rutile | Zincite |
| Crystallite size (nm) | 40 | 10 | 35 | 15 |
| Area % of coated particle A | | 80 | | 70 |
| Coating thickness (nm) | | 20 | | 32 |
| Average particle diameter A (μm) | | 5.0 | | 0.20 |

TABLE 2

Characteristic of the ceramic powders obtained according to the conditions of example 3.

| Material | Properties | | |
| --- | --- | --- | --- |
| (ceramic oxide) | Medium size particle (μm) | Crystallite dimension(nm) | Crystalline Phases |
| Magnesium aluminate | 4.7 | 50 | Magnesium aluminate |

The invention claimed is:

1. Process for preparing a ceramic powder coated with a nanoparticle layer comprising:
    introducing in a water-in-oil (W/O) emulsion at least a precursor that is either in a solid state or dissolved in the W/O emulsion, and then
    detonating the W/O emulsion such that during the detonation stage, the precursor decomposes to synthesize nanoparticles (b), which are deposited on a base ceramic particle (A), forming a coating layer of nanoparticles (b), wherein the base ceramic particle (A) is either synthesized during the W/O emulsion detonation stage or added and homogenized in the W/O emulsion prior to the detonation stage,
    wherein a detonation temperature of the detonation stage is less than 800° C.

2. The process according to claim 1, wherein the W/O emulsion comprises an internal aqueous phase and an external insoluble phase, wherein the internal aqueous phase and the external insoluble phase are linked under action of a surfactant.

3. The process according to claim 2, wherein the at least a precursor of the nanoparticles (b) is added in the solid state to the W/O emulsion and both the base ceramic particles (A) and the nanoparticles (b) are synthesized during the detonation of the W/O emulsion.

4. The process according to claim 2, wherein the at least a precursor further comprises a precursor of the base ceramic particles (A) and wherein the precursor of the base ceramic particles (A) and the precursor of the nanoparticles (b) have different reaction kinetics during the detonation of the W/O emulsion, wherein the precursor of the base ceramic particles (A) precedes and supports the advance of the shock wave (Taylor zone), and the precursor of the nanoparticles (b) reacts in a subsequent phase of the Taylor zone.

5. The process according to claim 2, wherein the base ceramic particles (A) are added directly to the W/O emulsion and homogenized in the internal phase of the W/O emulsion.

6. The process according to claim 1, wherein the at least a precursor of the nanoparticles (b) is added in the solid state to the W/O emulsion and both the base ceramic particles (A) and the nanoparticles (b) are synthesized during the detonation of the W/O emulsion.

7. The process according to claim 6, wherein the at least a precursor further comprises a precursor of the base ceramic particles (A) and wherein the precursor of the base ceramic particles (A) and the precursor of the nanoparticles (b) have different reaction kinetics during the detonation of the W/O emulsion, wherein the precursor of the base ceramic particles (A) has faster reaction kinetics than the precursor of the nanoparticles (b), and wherein the precursor of the base ceramic particles (A) reacts inside or behind the reaction zone in a zone that precedes and supports the advance of the shock wave (Taylor zone), and the precursor of the nanoparticles (b) reacts in a subsequent phase of the Taylor zone.

8. The process according to claim 1, wherein the at least a precursor further comprises a precursor of the base ceramic particles (A) and wherein the precursor of the base ceramic particles (A) and the precursor of the nanoparticles (b) have different reaction kinetics during the detonation of the W/O emulsion, wherein the precursor of the base ceramic particles (A) has faster reaction kinetics than the precursor of the nanoparticles (b), and wherein the precursor of the base ceramic particles (A) reacts inside or behind the reaction zone in a zone that precedes and supports the advance of the shock wave (Taylor zone), and the precursor of the nanoparticles (b) reacts in a subsequent phase of the Taylor zone.

9. The process according to claim 1, wherein the base ceramic particles (A) are added directly to the W/O emulsion and homogenized in the internal phase of the W/O emulsion.

10. The process according to claim 9, wherein the forming of the coating layer is controlled by the detonation temperature of the W/O emulsion and wherein the detonation temperature of the W/O emulsion is below the decomposition temperature of the base ceramic particle (A) and below the reaction temperature in the solid state between the base ceramic particle (A) and the nanoparticles (b).

11. The process according to claim 9, wherein forming the ceramic powder is controlled by the detonation temperature of the W/O emulsion, and wherein the detonation temperature of the W/O emulsion is higher than the reaction temperature in the solid state between the base ceramic particle (A) and the nanoparticles (b).

* * * * *